United States Patent [19]

Stevens

[11] Patent Number: 5,784,544
[45] Date of Patent: Jul. 21, 1998

[54] METHOD AND SYSTEM FOR DETERMINING THE DATA TYPE OF A STREAM OF DATA

[75] Inventor: Jeffrey Scott Stevens, Endwell, N.Y.

[73] Assignee: International Business Machines Corporation, Armonk, N.Y.

[21] Appl. No.: 697,848

[22] Filed: Aug. 30, 1996

[51] Int. Cl.⁶ ................................................ G06F 15/00
[52] U.S. Cl. ................................................ 395/112
[58] Field of Search ......................... 395/101, 106, 395/109, 112, 113, 114, 117, 200.3, 200.31, 200.32, 200.35, 570, 800; 382/181, 184, 192, 194, 195; 258/500, 530, 405, 409, 437, 448; 370/326, 335, 345

[56] References Cited

U.S. PATENT DOCUMENTS

| | | | |
|---|---|---|---|
| 4,032,887 | 6/1977 | Roberts | 340/146.3 ED |
| 4,058,795 | 11/1977 | Balm | 340/146.3 WD |
| 4,068,300 | 1/1978 | Bachman | 707/1 |
| 4,425,626 | 1/1984 | Parmet et al. | 364/900 |
| 4,992,957 | 2/1991 | Aoyama et al. | 395/112 |
| 5,293,466 | 3/1994 | Bringmann | 395/114 |
| 5,353,388 | 10/1994 | Motoyama | 395/117 |
| 5,481,742 | 1/1996 | Worley et al. | 395/800 |
| 5,491,720 | 2/1996 | Davis et al. | 375/222 |
| 5,675,575 | 10/1997 | Wall, Jr. et al. | 370/326 |

OTHER PUBLICATIONS

L. McLaughlin III, Editor, "Line Printer Daemon Protocol," The Wollongong Group, Network Printing Working Group, Request for Comments: 1179, pp. 1–14 (Aug. 1990).

AS/400 Advanced Series TCP/IP Configuration and Reference, Version 3, IBM Publication No. SC41–3420–02, Section 4.10.2 to 4.10.2.13.2 (1994).

Primary Examiner—David K. Moore
Assistant Examiner—Gabriel I. Garcia
Attorney, Agent, or Firm—Lawrence R. Fraley; Heslin & Rothenberg, P.C.

[57] ABSTRACT

A data type detection facility for determining the data type of an incoming stream of data. The characters of the data stream are first tested to determine if they are valid characters of one data type (e.g., EBCDIC). A count of the valid characters is obtained. Then, the data stream is assumed to be of another data type (e.g., ASCII), and the characters of the data stream are translated from that data type to the first data type. After the translation, the same test for valid characters is made and another count is obtained. The two counts are then compared to determine the data type of the data stream.

35 Claims, 3 Drawing Sheets

*300*

| | | | | | | | |
|---|---|---|---|---|---|---|---|
| 0x00, | 0x01, | 0x02, | 0x03, | 0x37, | 0x2D, | 0x2E, | 0x2F, |
| 0x16, | 0x05, | 0x25, | 0x0B, | 0x0C, | 0x0D, | 0x0E, | 0x0F, |
| 0x10, | 0x11, | 0x12, | 0x13, | 0x3C, | 0x3D, | 0x32, | 0x26, |
| 0x18, | 0x19, | 0x3F, | 0x27, | 0x22, | 0x1D, | 0x35, | 0x1F, |
| 0x40, | 0x5A, | 0x7F, | 0x7B, | 0x5B, | 0x6C, | 0x50, | 0x7D, |
| 0x4D, | 0x5D, | 0x5C, | 0x4E, | 0x6B, | 0x60, | 0x4B, | 0x61, |
| 0xF0, | 0xF1, | 0xF2, | 0xF3, | 0xF4, | 0xF5, | 0xF6, | 0xF7, |
| 0xF8, | 0xF9, | 0x7A, | 0x5E, | 0x4C, | 0x7E, | 0x6E, | 0x6F, |
| 0x7C, | 0xC1, | 0xC2, | 0xC3, | 0xC4, | 0xC5, | 0xC6, | 0xC7, |
| 0xC8, | 0xC9, | 0xD1, | 0xD2, | 0xD3, | 0xD4, | 0xD5, | 0xD6, |
| 0xD7, | 0xD8, | 0xD9, | 0xE2, | 0xE3, | 0xE4, | 0xE5, | 0xE6, |
| 0xE7, | 0xE8, | 0xE9, | 0xAD, | 0xE0, | 0xBD, | 0x5F, | 0x6D, |
| 0x79, | 0x81, | 0x82, | 0x83, | 0x84, | 0x85, | 0x86, | 0x87, |
| 0x88, | 0x89, | 0x91, | 0x92, | 0x93, | 0x94, | 0x95, | 0x96, |
| 0x97, | 0x98, | 0x99, | 0xA2, | 0xA3, | 0xA4, | 0xA5, | 0xA6, |
| 0xA7, | 0xA8, | 0xA9, | 0xC0, | 0x4F, | 0xD0, | 0xA1, | 0x07, |
| 0x43, | 0x20, | 0x21, | 0x1C, | 0x23, | 0xEB, | 0x24, | 0x9B, |
| 0x71, | 0x28, | 0x38, | 0x49, | 0x90, | 0xBA, | 0xEC, | 0xDF, |
| 0x45, | 0x29, | 0x2A, | 0x9D, | 0x72, | 0x2B, | 0x8A, | 0x9A, |
| 0x67, | 0x56, | 0x64, | 0x4A, | 0x53, | 0x68, | 0x59, | 0x46, |
| 0xEA, | 0xDA, | 0x2C, | 0xDE, | 0x8B, | 0x55, | 0x41, | 0xFE, |
| 0x58, | 0x51, | 0x52, | 0x48, | 0x69, | 0xDB, | 0x8E, | 0x8D, |
| 0x73, | 0x74, | 0x75, | 0xFA, | 0x15, | 0xB0, | 0xB1, | 0xB3, |
| 0xB4, | 0xB5, | 0x6A, | 0xB7, | 0xB8, | 0xB9, | 0xCC, | 0xBC, |
| 0xAB, | 0x3E, | 0x3B, | 0x0A, | 0xBF, | 0x8F, | 0x3A, | 0x14, |
| 0xA0, | 0x17, | 0xCB, | 0xCA, | 0x1A, | 0x1B, | 0x9C, | 0x04, |
| 0x34, | 0xEF, | 0x1E, | 0x06, | 0x08, | 0x09, | 0x77, | 0x70, |
| 0xBE, | 0xBB, | 0xAC, | 0x54, | 0x63, | 0x65, | 0x66, | 0x62, |
| 0x30, | 0x42, | 0x47, | 0x57, | 0xEE, | 0x33, | 0xB6, | 0xE1, |
| 0xCD, | 0xED, | 0x36, | 0x44, | 0xCE, | 0xCF, | 0x31, | 0xA4, |
| 0xFC, | 0x9E, | 0xAE, | 0x8C, | 0xDD, | 0xDC, | 0x39, | 0xFB, |
| 0x80, | 0xAF, | 0xFD, | 0x78, | 0x76, | 0xB2, | 0x9F, | 0xFF. |

1
METHOD AND SYSTEM FOR DETERMINING THE DATA TYPE OF A STREAM OF DATA

TECHNICAL FIELD

This invention relates, in general, to data processing, and in particular, to a data type detection facility, which is used to determine whether the data type of a data stream is EBCDIC or ASCII.

BACKGROUND ART

The Extended Binary Coded Decimal Interchange Code (EBCDIC) and the American Standard Code for Information Interchange (ASCII) are two well known data types. While the ASCII data type is the industry standard, the EBCDIC data type is also widely used. For example, many of the hardware platforms offered by International Business Machines Corporation implement hardware support for EBCDIC code pages, even though the standard is ASCII. Thus, in order to migrate data between the EBCDIC and ASCII platforms, data type conversion takes place in order to preserve the original characters.

One specific example of an EBCDIC based host is the AS/400 offered by International Business Machines Corporation. The AS/400 receives many print files from ASCII hosts through a TCP/IP protocol defined in the Internet Request for Comments (RFC) 1179, called the Line Printer Daemon (LPD). (Network Printing Working Group, Request for Comments: 1179, L. McLaughlin III, Editor, The Wollongong Group, August 1990, is incorporated herein by reference in its entirety.) Since this protocol assumes the ASCII industry standard is used for all print file transfers, typically, the AS/400 converts the files received via this protocol from ASCII to EBCDIC so that the files can be printed. Thus, if the data is in fact EBCDIC, the data will be incorrectly converted.

Many computer customers have a combination of both EBCDIC and ASCII platforms and devices, and therefore, desire the capability to read or print files of both data types. Therefore, a need exists for a data type detection facility in which the data type of a stream of data can be determined, so that data files of various data types can be correctly converted or processed to generate the correct output. A further need exists for a facility that can automatically determine whether a given data file is ASCII or EBCDIC. A yet further need exists for a facility that can provide the capability of printing both EBCDIC and ASCII files using the same protocol.

SUMMARY OF THE INVENTION

The shortcomings of the prior art are overcome and additional advantages are provided through the provision of a data type detection facility. In one embodiment, a method for determining the data type of a data stream having one or more characters is provided. A first value indicative of a number of characters in the data stream of a first data type is determined. Then, the data stream is translated from a second data type to the first data type, and a second value indicative of a number of characters in the translated data stream of the first data type is determined. Thereafter, the first value and the second value are compared to determine whether the data type of the data stream is the first data type or the second data type.

In one embodiment, the first data type is EBCDIC and the second data type is ASCII. Additionally, in a further

2 embodiment, the first data type is selected as the data type when the first value is greater than two times the second value.

In another embodiment of the invention, a method for determining the data type of a data stream having one or more characters is provided, in which the method includes:

(a) initially determining whether a character of the data stream is of a first data type;

(b) incrementing a first value when the character is determined to be of the first data type;

(c) translating the character from a second data type to the first data type when the character is initially determined not to be of the first data type;

(d) determining whether the translated character is of the first data type;

(e) incrementing a second value when the translated character is of the first data type;

(f) repeating steps (a)–(e) for each character of the data stream; and (g) comparing the first value and the second value to determine whether the data type of the data stream is the first data type or the second data type.

In a further aspect of the present invention, a system for determining the data type of a data stream having one or more characters is provided. The system includes means for determining a first value indicative of a number of characters in the data stream of a first data type; means for translating the data stream from a second data type to the first data type; means for determining a second value indicative of a number of characters in the translated data stream of the first data type; and means for comparing the first value and the second value to determine whether the data type of the data stream is the first data type or the second data type.

In yet a further aspect of the present invention, a system for determining the data type of a data stream having one or more characters is provided, in which the system includes:

means for initially determining whether a character of the data stream is of a first data type;

means for incrementing a first value when the character is determined to be of the first data type;

means for translating the character from a second data type to the first data type when the character is initially determined not to be of the first data type;

means for determining whether the translated character is of the first data type;

means for incrementing a second value when the translated character is of the first data type;

means for repeating the initially determining, the incrementing the first value, the translating, the determining, and the incrementing the second value for each character of the data stream; and means for comparing the first value and the second value to determine whether the data type of the data stream is the first data type or the second data type.

In another aspect of the present invention, a computer program product including a computer useable medium having computer readable program code means therein for use in determining the data type of a data stream having one or more characters is provided. The computer readable program code means in the computer program product includes:

computer readable program code means for causing a computer to affect determining a first value indicative of a number of characters in the data stream of a first data type;

computer readable program code means for causing a computer to affect translating the data stream from a second data type to the first data type;

computer readable program code means for causing a computer to affect determining a second value indicative of a number of characters in the translated data stream of the first data type; and computer readable program code means for causing a computer to affect comparing the first value and the second value to determine whether the data type of the data stream is the first data type or the second data type.

The data type facility of the present invention advantageously enables the automatic detection of the data type of a data stream. It provides customers with the ability to read or print data streams of various data types. It gives flexibility to customers in that they can send data to either EBCDIC or ASCII printers. Additionally, customers can also send EBCDIC files to, for instance, the AS/400 that are readable.

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 3 depicts one example of an ASCII to EBCDIC conversion table used in accordance with the principles of the present invention.

BEST MODE FOR CARRYING OUT THE INVENTION

A data type detection facility is provided in which the data type of a data stream is determined such that the data stream can be properly read, processed or printed. In one example, the data type detection facility of the present invention determines whether the data type of a data stream is EBCDIC or ASCII.

Figure 1:
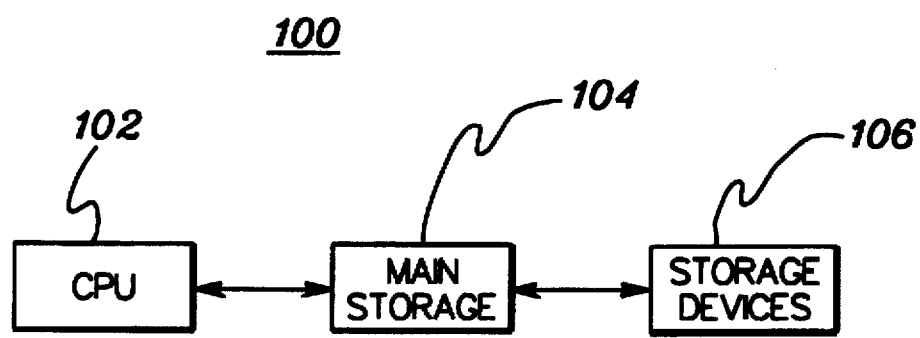
FIG. 1 depicts one example of a computer system incorporating and using the data type detection facility of the present invention.

In one embodiment, the data type detection facility of the present invention is incorporated and used in a computer system, such as the one depicted in FIG. 1. Computer system 100 includes, for instance, one or more central processing units 102, a main storage 104 and one or more storage devices 106, each of which is described below.

As is known, central processing unit (CPU) 102 is the controlling center of computing system 100. It provides the sequencing and processing facilities for instruction execution, interruption action, timing functions, initial program loading and other machine related functions. The central processing unit executes at least one operating system, which as known, is used to control the operation of the computer by controlling the execution of other programs, controlling communication with peripheral devices, and controlling use of the computer resources. The data type detection facility of the present invention is a communications function, which is controlled by the operating system in a similar fashion to other communications protocols and/or programs.

Central processing unit 102 is coupled to main storage 104, which is directly addressable and provides for high-speed processing of data by the central processing unit(s). Main storage may be either physically integrated with the CPU(s) or constructed in stand-alone units.

Main storage 104 is also coupled to storage devices 106, which include input/output devices, as well as other types of storage devices. Data is transferred from main storage 104 to storage devices 106 and from the storage devices back to main storage.

One example of computer system 100 incorporating and using the data type detection facility of the present invention is an AS/400 offered by International Business Machines Corporation. This is only one example, however. The facility of the present invention can be used within other computing environments or with other computer systems without departing from the spirit of the present invention.

As described above, the AS/400 is an EBCDIC based host that receives many print files from ASCII hosts through, for instance, the Line Printer Daemon. This protocol assumes industry standard ASCII is used for all print file transfers, and supplies no mechanism to indicate when the data is EBCDIC. Since customers often have a combination of both EBCDIC and ASCII platforms and devices, there is a desire to be able within the AS/400 TCP/IP LPD servers to recognize when data is being sent as EBCDIC, so that conversions or other processing can occur to generate the desired output. It is the data type detection facility of the present invention that is used to automatically determine when the incoming data is EBCDIC instead of ASCII.

Figure 2:
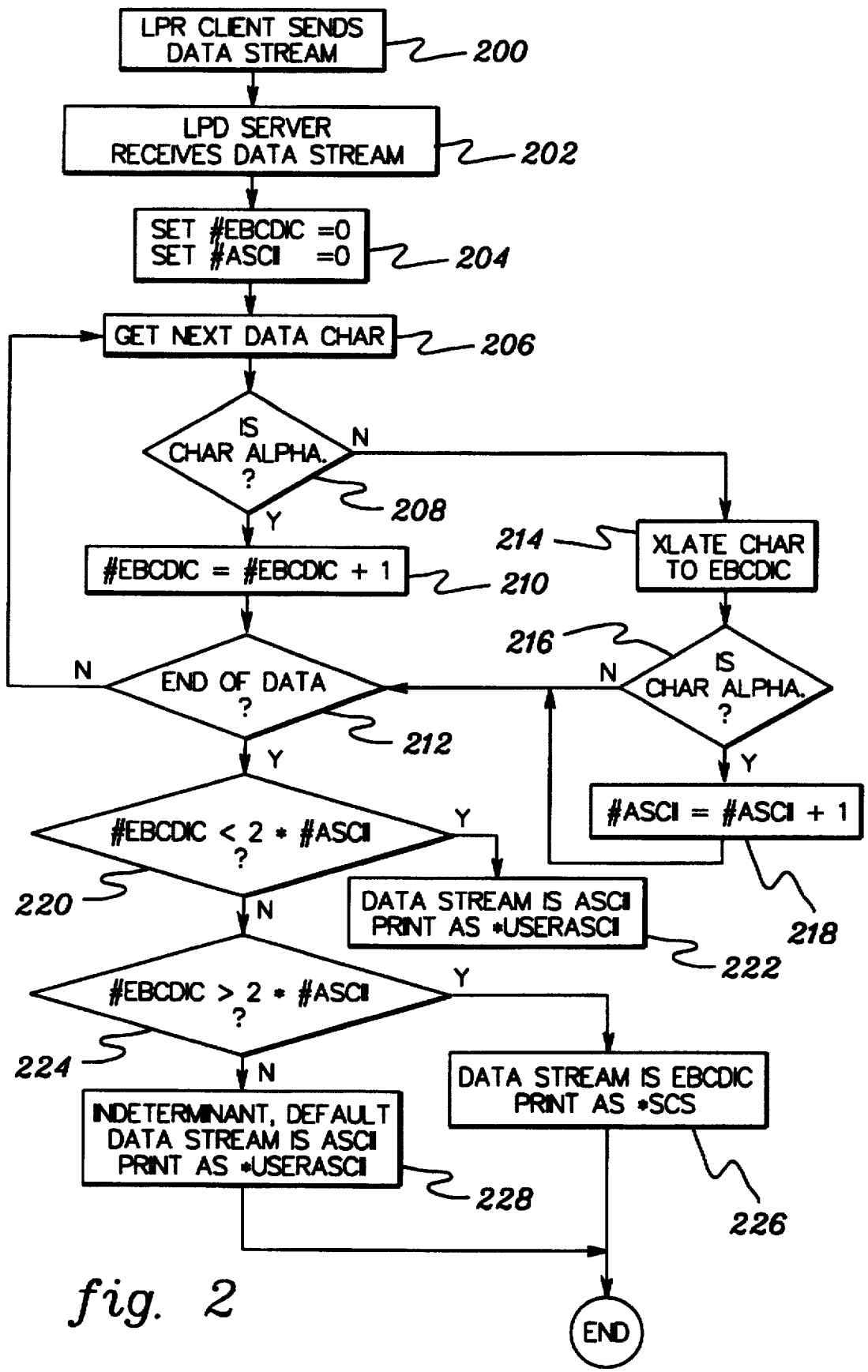
FIG. 2 depicts one example of the logic associated with detecting the data type of a stream of data, in accordance with the principles of the present invention.

One operational example of the data type detection facility of the present invention is described in detail with reference to FIG. 2. Initially, a data stream having one or more characters is sent via, for instance, a Line Printer Requester (LPR) client to an LPD server for printing on a printer coupled to an AS/400 computer, STEP 200. The LPD server receives the data stream, STEP 202, and then, determines whether the transmitted data stream is of an EBCDIC or ASCII data type.

Prior to beginning the detection process, two counters, #EBCDIC and #ASCII, are initialized to zero, STEP 204. #EBCDIC represents the number of valid EBCDIC characters in the data stream and #ASCII represents the number of valid ASCII characters in the data stream.

Subsequent to initializing the two counters, a character from the data stream is obtained, STEP 206, and a check is made to see if the character is printable, INQUIRY 208. In particular, the character is tested to determine if it is an alphanumeric character (e.g., A–Z, a–z, 0–9). In one embodiment, this test is performed using a standard C runtime function, referred to as isalpha( ), available with C compilers or development toolkits. It will be apparent to those skilled in the relevant art that the use of this particular function is only one example. Other functions or routines (either off-the-shelf or custom made) can also be used to make this determination.

Should the character be an alphanumeric character, the #EBCDIC counter is incremented by one indicating that this is a valid EBCDIC character, STEP 210. Thereafter, a check is made to see if the end of the data stream has been reached, INQUIRY 212. If the end has not been reached, then processing continues with STEP 206 "GET NEXT DATA CHAR."

Returning to INQUIRY 208, if the character is not an alphanumeric character, then the character is assumed to be ASCII and it is translated from ASCII to EBCDIC, STEP 214. Techniques for translating from ASCII to EBCDIC are known in the art. However, one example is described below.

In one embodiment, in order to translate a character from ASCII to EBCDIC, a translation table is used. One example of such a translation table is depicted in FIG. 3. Translation table 300 is a 256 character table for use in translating characters from ASCII to EBCDIC. Standard 7-bit US ASCII is used, likewise for EBCDIC. The offset into the table is the byte value of the character to be translated. The character values run from 0 to 255.

For example, in order to translate an ASCII 'A' to EBCDIC, the decimal equivalent of the ASCII 'A' (i.e., 65) is used as an offset into the table. At the 65th position within table 300 is 0×C1 (hex). C1 (hex) is equivalent to 193 decimal and is the EBCDIC 'A'. In one embodiment, this translation from ASCII to EBCDIC is non-destructive in that the original character is not modified. The translation is performed on a copy of the character and the translation is not saved. (In another embodiment, the translation can be saved for further use after the data type is determined.)

Subsequent to translating the character from ASCII to EBCDIC, a test is made to determine if the character is alphanumeric (i.e., is the character of a valid EBCDIC type), INQUIRY 216. If the character is a valid alphanumeric character, then the #ASCII counter is incremented by one indicating that the character was input as an ASCII character, STEP 218.

Thereafter, processing continues with INQUIRY 212 "END OF DATA?," as described above. Additionally, returning to INQUIRY 216 "IS CHAR ALPHA.?," if the translated character is not a valid alphanumeric character, then the character is assumed to be a control character of neither an EBCDIC nor ASCII data type and no count is incremented. Thus, processing once again proceeds with INQUIRY 212 "END OF DATA?"

When the end of the data stream is reached, then the counts are compared to one another to determine whether the incoming data stream is of an EBCDIC or ASCII data type. If #EBCDIC is less than two times #ASCII (i.e., #EBCDIC<2×#ASCII), INQUIRY 220, then the data stream is ASCII and an *USERASCII print spool file is created, STEP 222. If, however, #EBCDIC is not less than two times #ASCII, then a further check is made to determine if #EBCDIC is greater than two times #ASCII, INQUIRY 224. If #EBCDIC is greater than two times #ASCII, then the data stream is EBCDIC and an *SCS print spool file is created, STEP 226. (The creation of *USERASCII and *SCS spooled files is described in AS/400 Advanced Series TCP/IP Configuration and Reference V3, IBM Publication Number SC41-3420-02 (1994), which is incorporated herein by reference in its entirety.

Returning to INQUIRY 224, if, however, #EBCDIC is not greater than two times #ASCII (and therefore, #EBCDIC= 2×#ASCII), then it cannot be determined whether the data is EBCDIC or ASCII, so it is assumed that the data stream is ASCII and an *USERASCII print spool file is created, as described above, STEP 228.

Described above is a data type detection facility in which the data type of an input data stream is determined. After the data type is determined, then the data stream can be read, processed or printed correctly (using EBCDIC to ASCII, or ASCII to EBCDIC translations, if necessary), depending on the wishes of the customer.

In the embodiment described above, each character is tested individually and only certain characters are translated. This is only one example. In another embodiment, the data stream is first tested to determine how many characters are valid EBCDIC characters (i.e., valid alphanumeric characters). Then, the entire data stream is translated from ASCII to EBCDIC and the translated data is tested to determine the number of alphanumeric characters. The results from the two tests are then compared in the manner described above to determine whether the data stream is EBCDIC or ASCII.

In another embodiment of the invention, the data type detection facility can be executed on an ASCII platform. In that case, the data stream is first assumed to be ASCII, so the test for a valid alphanumeric character at, for instance, INQUIRY 208, indicates whether the character is a valid ASCII alphanumeric character. If so, #ASCII is incremented at STEP 210, instead of #EBCDIC. Additionally, at STEP 214, the translation is from EBCDIC to ASCII and the test at INQUIRY 216 again checks for valid ASCII characters. If the character is valid, then #EBCDIC is incremented at STEP 218, instead of #ASCII. The remaining checks remain the same.

Likewise, similar changes can be made to accommodate other data types. Additionally, changes can be made to expand the logic to cover a comparison of more than two data types. These are therefore, considered a part of the claimed invention.

In yet another embodiment of the invention, the test for valid characters of a particular data type can be other than testing for alphanumeric characters. It can be, for example, a test of a subset of any valid characters of a particular data type or types. For instance, it can be a test for a subset of alpha characters, numeric characters, any other types of characters or any combination therebetween. The test for alphanumeric characters is just one example.

The flow diagram depicted herein is just exemplary. There may be many variations to this diagram or the steps described therein without departing from the spirit of the invention. For instance, the steps may be performed in a differing order, or steps may be added, deleted or modified. All of these variations are considered a part of the claimed invention.

The facility of the present invention can be included in one or more computer program products including computer useable media, in which the media include computer readable program code means for providing and facilitating the mechanisms of the present invention. The products can be included as part of a computer system or sold separately.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for determining the data type of a data stream having one or more characters, said method comprising:

determining a first value indicative of a number of characters of a first data type in said data stream;

translating said data stream from a second data type to said first data type;

determining a second value indicative of a number of characters of said first data type in said translated data stream; and comparing said first value and said second value to determine whether said data type of said data stream is said first data type or said second data type.

2. The method of claim 1, wherein said first data type is EBCDIC and said second data type is ASCII.

3. The method of claim 1, wherein said comparing comprises using a predefined function to determine whether said data type is said first data type or said second data type.

4. The method of claim 3, wherein said predefined function comprises comparing said first value to two times said second value to determine said data type.

5. The method of claim 4, further comprising selecting said first data type as said data type when said first value is greater than two times said second value.

6. The method of claim 4, further comprising selecting said second data type as said data type when said first value is less than two times said second value.

7. The method of claim 4, further comprising defaulting to said second data type as said data type when said first value is equal to two times said second value.

8. The method of claim 1, wherein said determining said first value comprises tracking a number of alphanumeric characters.

9. The method of claim 1, wherein said determining said second value comprises tracking a number of alphanumeric characters.

10. A method for determining the data type of a data stream having one or more characters, said method comprising:

(a) initially determining whether a character of said data stream is of a first data type;

(b) incrementing a first value when said character is determined to be of said first data type;

(c) translating said character from a second data type to said first data type when said character is initially determined not to be of said first data type;

(d) determining whether said translated character is of said first data type;

(e) incrementing a second value when said translated character is of said first data type;

(f) repeating steps (a)–(e) for each character of said data stream; and (g) comparing said first value and said second value to determine whether said data type of said data stream is said first data type or said second data type.

11. The method of claim 10, wherein said comparing indicates said data type is said first data type when said first value is more than twice said second value.

12. The method of claim 10, wherein said comparing indicates said data type is said second data type when said first value is less than twice said second value.

13. The method of claim 10, wherein said first data type is EBCDIC and said second data type is ASCII.

14. A system for determining the data type of a data stream having one or more characters, said system comprising:

means for determining a first value indicative of a number of characters of a first data type in said data stream;

means for translating said data stream from a second data type to said first data type;

means for determining a second value indicative of a number of characters of said first data type in said translated data stream; and means for comparing said first value and said second value to determine whether said data type of said data stream is said first data type or said second data type.

15. The system of claim 14, wherein said first data type is EBCDIC and said second data type is ASCII.

16. The system of claim 14, wherein said means for comparing comprises means for using a predefined function to determine whether said data type is said first data type or said second data type.

17. The system of claim 16, wherein said predefined function comprises a comparison of said first value to two times said second value to determine said data type.

18. The system of claim 17, further comprising means for selecting said first data type as said data type when said first value is greater than two times said second value.

19. The system of claim 17, further comprising means for selecting said second data type as said data type when said first value is less than two times said second value.

20. The system of claim 17, further comprising means for defaulting to said second data type as said data type when said first value is equal to two times said second value.

21. The system of claim 14, wherein said means for determining said first value comprises means for tracking a number of alphanumeric characters.

22. The system of claim 14, wherein said means for determining said second value comprises means for tracking a number of alphanumeric characters.

23. A system for determining the data type of a data stream having one or more characters, said system comprising:

means for initially determining whether a character of said data stream is of a first data type;

means for incrementing a first value when said character is determined to be of said first data type;

means for translating said character from a second data type to said first data type when said character is initially determined not to be of said first data type;

means for determining whether said translated character is of said first data type;

means for incrementing a second value when said translated character is of said first data type;

means for repeating said initially determining, said incrementing said first value, said translating, said determining, and said incrementing said second value for each character of said data stream; and means for comparing said first value and said second value to determine whether said data type of said data stream is said first data type or said second data type.

24. The system of claim 23, wherein said means for comparing indicates said data type is said first data type when said first value is more than twice said second value.

25. The system of claim 23, wherein said means for comparing indicates said data type is said second data type when said first value is less than twice said second value.

26. The system of claim 23, wherein said first data type is EBCDIC and said second data type is ASCII.

27. A computer program product comprising a computer useable medium having computer readable program code means therein for use in determining the data type of a data stream having one or more characters, said computer readable program code means in said computer program product comprising:

computer readable program code means for causing a computer to affect determining a first value indicative of a number of characters of a first data type in said data stream;

computer readable program code means for causing a computer to affect translating said data stream from a second data type to said first data type;

computer readable program code means for causing a computer to affect determining a second value indicative of a number of characters of said first data type in said translated data stream; and computer readable program code means for causing a computer to affect comparing said first value and said second value to determine whether said data type of said data stream is said first data type or said second data type.

28. The computer readable program code means of claim 27, wherein said first data type is EBCDIC and said second data type is ASCII.

29. The computer readable program code means of claim 27, wherein said computer readable program code means for causing a computer to affect comparing comprises computer readable program code means for causing a computer to affect using a predefined function to determine whether said data type is said first data type or said second data type.

30. The computer readable program code means of claim 27, wherein said computer readable program code means for causing a computer to affect determining said first value comprises computer readable program code means for causing a computer to affect tracking a number of alphanumeric characters.

31. The computer readable program code means of claim 27, wherein said computer readable program code means for causing a computer to affect determining said second value comprises computer readable program code means for causing a computer to affect tracking a number of alphanumeric characters.

32. A computer program product comprising a computer useable medium having computer readable program code means therein for use in determining the data type of a data stream having one or more characters, said computer readable program code means in said computer program product comprising:

computer readable program code means for causing a computer to affect initially determining whether a character of said data stream is of a first data type;

computer readable program code means for causing a computer to affect incrementing a first value when said character is determined to be of said first data type;

computer readable program code means for causing a computer to affect translating said character from a second data type to said first data type when said character is initially determined not to be of said first data type;

computer readable program code means for causing a computer to affect determining whether said translated character is of said first data type;

computer readable program code means for causing a computer to affect incrementing a second value when said translated character is of said first data type;

computer readable program code means for causing a computer to affect repeating said initially determining, said incrementing said first value, said translating, said determining, and said incrementing said second value for each character of said data stream; and computer readable program code means for causing a computer to affect comparing said first value and said second value to determine whether said data type of said data stream is said first data type or said second data type.

33. The computer readable program code means of claim 32, wherein said computer readable program code means for causing a computer to affect comparing indicates said data type is said first data type when said first value is more than twice said second value.

34. The computer readable program code means of claim 32, wherein said computer readable program code means for causing a computer to affect comparing indicates said data type is said second data type when said first value is less than twice said second value.

35. The computer readable program code means of claim 32, wherein said first data type is EBCDIC and said second data type is ASCII.

* * * * *